United States Patent
Wang et al.

(10) Patent No.: US 11,843,642 B1
(45) Date of Patent: *Dec. 12, 2023

(54) SERVERLESS SIGNALING IN PEER-TO-PEER SESSION INITIALIZATION

(71) Applicant: Amazon Technologies, Inc., Seattle, WA (US)

(72) Inventors: Jialu Wang, North Plains, OR (US); Michael Coleman, Portland, OR (US); Garrett Sparks, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,259

(22) Filed: Mar. 8, 2021

Related U.S. Application Data

(63) Continuation of application No. 16/284,893, filed on Feb. 25, 2019, now Pat. No. 10,944,801.

(51) Int. Cl.
*H04L 65/1069* (2022.01)
*H04L 9/40* (2022.01)
*H04L 67/104* (2022.01)
*H04L 65/65* (2022.01)

(52) U.S. Cl.
CPC ...... *H04L 65/1069* (2013.01); *H04L 63/0876* (2013.01); *H04L 63/102* (2013.01); *H04L 65/65* (2022.05); *H04L 67/104* (2013.01)

(58) Field of Classification Search
CPC ............. H04L 65/1069; H04L 63/0876; H04L 63/102; H04L 65/608; H04L 67/104
See application file for complete search history.

(56) References Cited

U.S. PATENT DOCUMENTS

| | | | |
|---|---|---|---|
| 9,591,582 B1 * | 3/2017 | Rabii | H04W 76/14 |
| 686,323 A1 * | 6/2017 | Helter | H04L 65/1066 |
| 10,382,380 B1 * | 8/2019 | Suzani | H04L 51/30 |
| 10,944,801 B1 | 3/2021 | Wang et al. | |
| 2003/0177187 A1 | 9/2003 | Levine et al. | |
| 2006/0167897 A1 * | 7/2006 | Jones | H04L 51/18 |

(Continued)

FOREIGN PATENT DOCUMENTS

WO WO-2014102720 A1 * 7/2014 ........... G06F 3/0481

*Primary Examiner* — Hamza N Algibhah
*Assistant Examiner* — Tesfu N Mekonen
(74) *Attorney, Agent, or Firm* — Knobbe, Martens, Olson & Bear, LLP

(57) ABSTRACT

Systems and methods are described for facilitating delivery of resources via peer-to-peer connections without requiring an intermediary signaling server. Typically, before establishing a peer-to-peer connection, peers must exchange signaling information such as their reachability over a network. Traditional systems often rely on an intermediary signaling server to act as a go-between for peers and assist in the exchange of signaling information. The present disclosure removes the need for a signaling server. Instead, peers may utilize message collections on a messaging system to exchange signaling information. A requesting peer may submit a request to access a resource to a message collection for that resource. A providing peer may obtain the request, and submit a response to a message collection for the requesting peer. Peers may continue to exchange information via the collections until a peer-to-peer connection is established.

20 Claims, 7 Drawing Sheets

(56) References Cited

U.S. PATENT DOCUMENTS

| | | | |
|---|---|---|---|
| 2009/0132868 A1* | 5/2009 | Chkodrov | H04L 51/00 |
| | | | 714/E11.187 |
| 2009/0225976 A1 | 9/2009 | Kudo | |
| 2009/0271412 A1 | 10/2009 | Lacapra et al. | |
| 2010/0131658 A1 | 5/2010 | Goyal et al. | |
| 2010/0333111 A1* | 12/2010 | Kothamasu | H04L 51/14 |
| | | | 719/313 |
| 2011/0004701 A1 | 1/2011 | Panda et al. | |
| 2011/0270763 A1* | 11/2011 | Graham, III | G06Q 20/3829 |
| | | | 705/71 |
| 2012/0008495 A1 | 1/2012 | Shen et al. | |
| 2012/0023172 A1 | 1/2012 | Kumarasamy et al. | |
| 2014/0195612 A1 | 7/2014 | Guo et al. | |
| 2015/0281294 A1 | 10/2015 | Nur et al. | |
| 2016/0294913 A1* | 10/2016 | Jansson | H04L 67/02 |
| 2016/0308915 A1 | 10/2016 | Balasaygun et al. | |
| 2017/0226616 A1 | 1/2017 | Nur et al. | |
| 2017/0353508 A1 | 12/2017 | Yoakum | |
| 2018/0054302 A1 | 2/2018 | Shveykin et al. | |
| 2018/0376107 A1* | 12/2018 | Shibaev | G08B 21/043 |
| 2019/0190986 A1 | 6/2019 | Mishra et al. | |
| 2020/0007530 A1* | 1/2020 | Mohamad Abdul | |
| | | | H04W 12/084 |

\* cited by examiner

SERVERLESS SIGNALING IN PEER-TO-PEER SESSION INITIALIZATION

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Various architectures exist to support communications over such networks. For example, in a "client-server" model, servers act as providers of resources, and clients act as requestors of those resources. Each client may request resources from a server, which in turn makes those resources available to clients. Servers are generally publicized (such as via the domain name system, or "DNS"), publicly addressable, and include a variety of functionalities to handle multiple concurrent requests for various clients.

An alternative to the "client-server" model is the "peer-to-peer" model, in which two devices are considered equal participants, often sharing resources between one another. In contrast to the client-server model, peers within a peer-to-peer model are often not publicized and not publicly available. For example, a peer may exist behind a network firewall or other networking system that limit external devices' abilities to directly access the peer. To overcome these restrictions, peers must often exchange information with one another as to how they may communicate. These messages enable peers to determine potential communication paths, and eventually to establish peer-to-peer communications. The exchange of message between peers in this manner is sometimes referred to as "signaling." Because signaling is necessary to establish a peer-to-peer communication path, signaling generally cannot occur via a peer-to-peer connection. Rather, an intermediary server (a "signaling server") is generally utilized to enable peers to conduct signaling between one another, eventually enabling peer-to-peer communication independent of the signaling server.

One example of peer-to-peer technology is peer-to-peer audio or video sharing, in which two users communicate with one another without the need for an intermediary server. Instead, audio and/or video from one peer to transmitted directly to another, and vice versa. An example of peer-to-peer audio/video sharing technology is the WebRTC ("Web Real-Time Communication") protocol. While WebRTC enables audio/video content to be transmitted directly between peers, the protocol does not define a particular signaling mechanism. As such, implementations of WebRTC generally utilize a signaling server.

DETAILED DESCRIPTION

Figure 1:
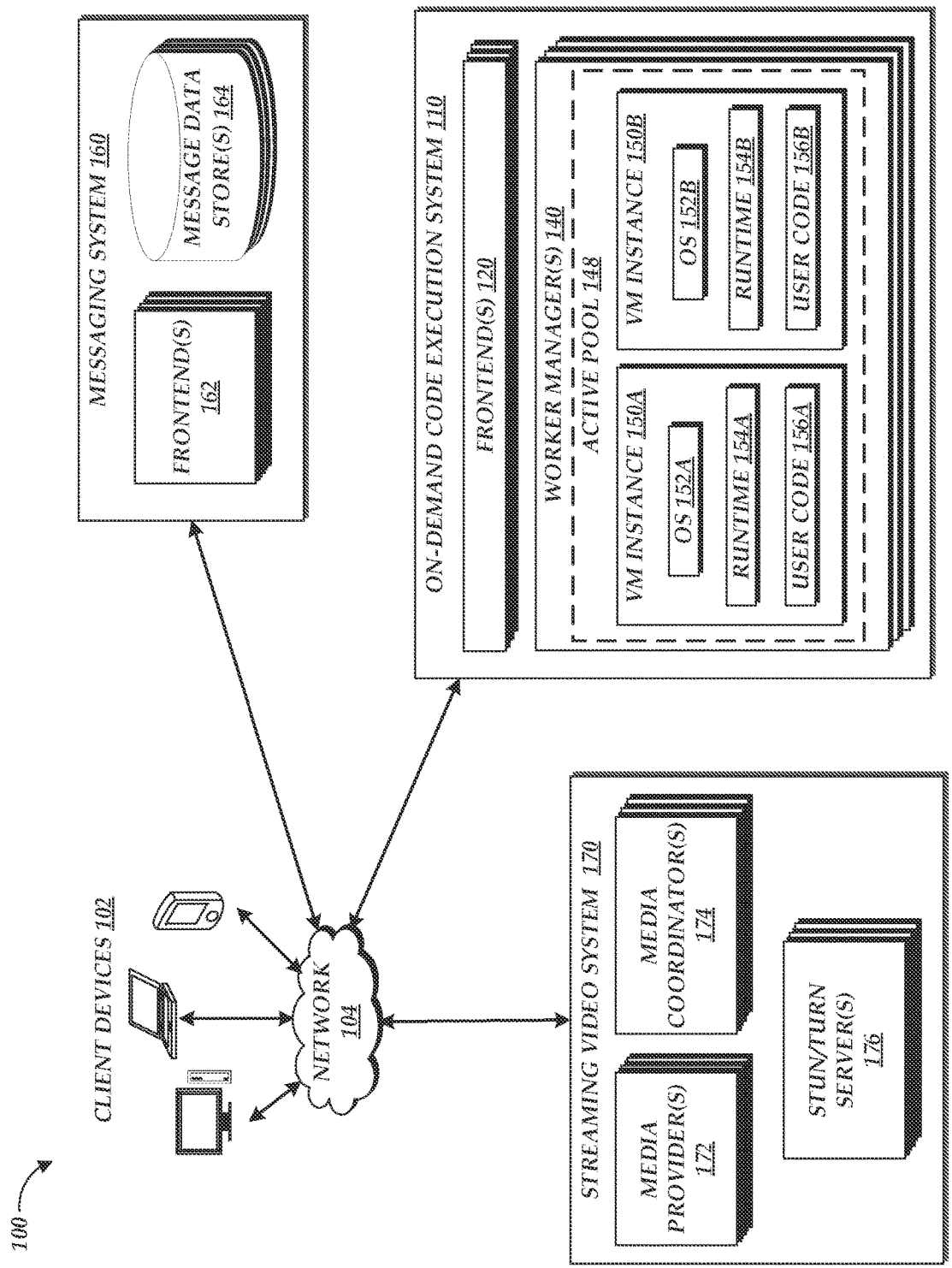
FIG. 1 is a block diagram of an illustrative operating environment in which a streaming video system and client devices may establish a peer-to-peer connection by use of signaling messages facilitated by a messaging system and on-demand code execution system.

Generally described, aspects of the present disclosure relate to facilitating signaling between peers to establish a peer-to-peer communication session, without requiring a dedicated signaling server. Specifically, embodiments of the present disclosure enable peers to utilize message queues within a message queuing service to communicate with one another to conduct signaling, avoiding the need for a dedicated signaling server intermediary. In one embodiment, the techniques disclosed herein can be utilized to enable transmission of video previews for a network-based video encoding service. For example, as disclosed in U.S. patent Ser. No. 16/143,264 (filed Sep. 26, 2018 and entitled "LIVE PREVIEWING OF STREAMING VIDEO IN THE CLOUD"; the "'264 Application"), the entirety of which is hereby incorporated by reference, a video preview service may utilize a peer-to-peer protocol, such as the WebRTC protocol, to transmit video previews to client devices. In accordance with embodiments of the present disclosure, each video preview may be associated with an identifier, and a queue on a message queuing system associated with the identifier. When attempting to establish a peer-to-peer connection with the video preview service, a client device may establish their own queue on the message queuing system, and transmit a signaling message to the queue for the video preview. The video preview service may dequeue the message, generate a response, and submit that response to the client's queue. The client may then obtain the message, thus facilitating two-way communication between the client and the video preview service without the use of a dedicated intermediary signaling service.

Illustratively, use of a message queuing system as an intermediary may beneficially reduce the computing resources used to facilitate signaling, relative to use of a dedicated signaling server. Generally, a dedicated signaling server would operate constantly, with sufficient capacity to handle those signaling requests expected to occur at any given time. However, because the rate of signaling between peers may vary, the computing resources required to be available at a signaling server would generally be expected to exceed those used at any given time—otherwise an additional request to use the signaling server would fail, leading to errors. As such, the signaling server would be expected to have unused compute resource capacity (e.g., in terms of processing power, bandwidth, memory, etc.), causing inefficiency. The present disclosure addresses this issue by effectively establishing "serverless" signaling, whereby signaling can occur between peers without use of a dedicated signaling server. Instead, queues of a message queuing system are utilized to facilitate signaling. The message queuing system as disclosed herein can represent a general purpose queuing system, and as such may be utilized for a variety of messaging tasks (not simply signaling). For example, a variety of network-based "microservices" (e.g., loosely coupled, lightweight services that each undertake specialized tasks but that when combined create beneficial functionality) may utilize the message queuing system to pass messages between one another. As such, excess capacity on the message queuing system is not "tied up" for use by a signaling server, but may be used to facilitate any type of messaging on the system. This results in tighter "packing" of compute resource usage, and more efficient operation overall.

In one embodiment, the "serverless" nature of the present disclosure is further expanded by use of an on-demand code execution system, as disclosed in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference. Generally described, such an on-demand code execution system enables uses to submit computer-executable code, and to thereafter request that the on-demand code execution system execute the code in response to a request (or "call" of the code). Rather than requiring that a client maintain a server to execute the code (or that the client itself execute the code), the on-demand code execution system can handle identification of a server with sufficient capacity to execute the code, generation of an execution environment (e.g., a virtual machine) in which to execute the code, provisioning of the environment with the code and any other necessary resources, and initialization of the code execution. Thus, the on-demand code execution system provides a simple mechanism for a client to execute code "on-demand," while reducing the need to configure resources to conduct that execution. In accordance with the present disclosure, an on-demand code execution system may be provided with code (which may be referred to as a "task") that operates to generate signaling messages for a peer-to-peer service, and handle queuing or dequeuing of messages on a message queuing system. The on-demand code execution system may provide an interface, such as an application programming interface (API) through which a client device may interact with the task. In one embodiment, the API complies with the "representational state transfer" (REST) architectural style (which style is known in the art), and thus represents a "RESTful API." Accordingly, by transmission of calls to the RESTful API, a client may conduct signaling with a video preview service, without use of an intermediary signaling server.

While example embodiments of the present disclosure will be described with respect video transmitted via a peer-to-peer connection, peer-to-peer connections within the present disclosure may be used to facilitate transmission of other types of data. For example, embodiments of the present disclosure may facilitate establishment of peer-to-peer connections to transmit audio, text, data, or other types of information.

As will be appreciated by one of skill in the art in light of the present disclosure, the embodiments disclosed herein improves the ability of computing systems, such as peer-to-peer communications systems, to initialize peer-to-peer communications in an efficient matter. Specifically, embodiments of the present disclosure increase the efficiency of computing resource usage of such systems by enabling signaling messages to be exchanged between peers without the use of an intermediary signaling server. Moreover, the presently disclosed embodiments address technical problems inherent within computing systems; specifically, the limited nature of computing resources, and the inefficiency of maintaining a dedicated signaling server with unused capacity. These technical problems are addressed by the various technical solutions described herein, including the use of queues on a message queuing system to facilitate exchange of messages between peers without the need for a signaling server. Thus, the present disclosure represents an improvement on existing peer-to-peer communications systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which a streaming video system 170 and client devices 102 may establish a peer-to-peer connection by use of signaling messages facilitated by a messaging system 160 and on-demand code execution system 110.

By way of illustration, various example client devices 102 are shown in communication with the streaming video system 170, messaging system 160, and on-demand code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

The streaming video system 170 illustratively corresponds to a system that enables client devices 102 to obtain video streams over a peer-to-peer protocol, such as WebRTC. The system 170 includes one or more media providers 172, which correspond to computing devices configured to provide video streams. In one embodiment, media providers 172 include a local data store that holds video that may be streamed to peer devices (e.g., client devices 102). In another embodiment, media providers 172 obtain video from another source. For example, the streaming video system 170 may be included within a network-based video encoding system (not shown in FIG. 1), to which client devices 102 may provide video (e.g., in a high-resolution format, such as a mezzanine file) for encoding. A media provider 172 may obtain that video either prior to or after encoding, packaging, or other modifications, and provide a low-resolution "preview" of the video back to the client device 102. In this manner, the client device 102 may, for example, verify that a video stream has been successfully provided to the encoding system, verify that encoding is resulting in video having desired characteristics, etc. Illustratively, the streaming video system 170 may correspond to a "media gateway" as discussed in FIGS. 4-6B of the '264 application, incorporated above, with the media providers 172 representing the "media servers" of that application and media coordinators 174 representing media clients of that application. The details of operation of a media server and media client according to that embodiment are discussed in more detail in the '264 application, and thus not repeated herein.

The streaming video system 170 of FIG. 1 further includes one or more media coordinators 174, which correspond to computing devices configured to facilitate transmission of signaling messages between media providers 172 and a queue associated with a video (or other resource). Specifically, media coordinators 174 may be configured to obtain communicate with media providers 172 via a network (e.g., over a "websocket," a communication protocol known in the art), to act as a relay for signaling messages sent between the media providers 172 and queues on a messaging system. The media coordinators 174 may illustratively modify signaling messages as necessary between the providers 172 and the queues, such as by modifying a format of messages received from the providers 172 to remain compliant with a queue, or vice versa. In accordance with the present disclosure, media coordinators 174 may be configured to send and receive messages from client devices 102 via queues on the messaging system 160, such as by reading from a queue associated with a video stream provided by media providers 172, and writing to a queue associated with a client device 102. In one embodiment, the messages are formatted according to the "Interactive Connectivity Establishment" (ICE) framework associated with the WebRTC protocol. The ICE framework is known in the art, and thus will not be described in detail herein.

The streaming video system 170 of FIG. 1 further includes one or more STUN/TURN servers 176. These servers 176 illustratively operate to provide Session Traversal Utilities (STUN) and Traversal Using Relay NAT (TURN, where 'NAT' stands for "Network Address Translation"), in accordance with the WebRTC protocol. Operation of STUN and TURN servers is generally known in the art, and thus will not be described in detail herein. However, in brief, STUN servers generally enable a device (e.g., a client device 102) to discover their public network address (e.g., internet protocol, or IP, address) by submitting a request to the STUN server and receiving a response with the devices public address, as derived from headers of the request. In most instances, exchanging of public address information is sufficient to establish peer-to-peer communications. However, in limited instances, configuration of a client device 102 may limit peer-to-peer communications. For example, a client device 102 may be behind a type of NAT, such as symmetrical NAT, which inhibits peer-to-peer connections. In such instances, a TURN server may act as a relay to enable communication between peers.

As noted above, rather than utilizing a signaling server to relay messages between peers (as prior techniques often require), embodiments of the present disclosure can utilize message collections on a messaging system, such as the system 160 of FIG. 1. As shown in FIG. 1, the messaging system 160 includes one or more frontends 162. The frontends 162 illustratively represent computing devices configured to enable other devices, such as client devices 102 or media coordinators 174, to post messages to and read messages from a logical collection of messages. In one embodiment, the collection of messages is a queue, and thus messages may be enqueued into and dequeued from the queue, such as in a first-in-first-out (FIFO) order. In another embodiment, the collection of messages is a "stream" into which messages may be placed and read from, which stream may maintain messages for a period of time (e.g., 24 hours). In other embodiments, the collections of messages are entries within databases, collections (or "buckets") of objects within network-storage locations, or the like. Messages within each collection are illustratively stored in message data stores 164, which can correspond to any memory sufficiently persistent to enable writing to and reading from logical message collection. The data stores 164 may for example be random access memory (RAM), solid state drives (SSDs), hard disk drives (HDDs), network attached storage (NAS), or the like. Examples of message queuing and message stream systems exist in the art. One example of a message queuing system is AMAZON™'s "Simple Queue Service", or "SQS." An example of a message streaming system is AMAZON's "Kinesis" system. For ease of reference, each logical collection of messages will be referred to herein as a message queue or simply a "queue." However, one skilled in the art will appreciate that message streams or other message collections (with or without "queuing" and "dequeuing" functionality) may also be utilized in accordance with the present disclosure.

In addition to the messaging system 160, embodiments of the present disclosure may further utilize an on-demand code execution system 110 to reduce computing requirements of client devices 102 and enable flexibility of operation, without requiring changes to a configuration of client devices 102. Operation of the on-demand code execution system 110 is described in detail within the '556 Patent, incorporated by reference above, and thus will not be repeated herein. However, in brief, the on-demand code execution system 110 includes one more frontends 120 through which devices, such as client devices 102, may submit executable code. The frontends 120 also provide an interface, such as command-line interfaces (CLIs), application programing interfaces (APIs), and/or other programmatic interfaces for requesting that the code be executed. Each individually callable portion of code may be referred to as a "task" executable on the system 110. On request, the frontends 120 may distribute to a worker manager 140 instructions to execute the code. The worker manager 140 may then configure a virtual machine instance (shown in FIG. 1 as VM instances 150A and 150B) within a "pool" of active instances (shown in FIG. 1 as active pool 148) with appropriate data to execute the code. For example, the worker manager 140 may provision each VM instance 150 with an appropriate operating system (OS 152A and OS 152B), runtime environment (runtimes 154A and B), and user code (codes 156A and 156B), and then cause the user code to execute within the environment. On completion of the execution, the worker manager 140 may destroy a VM instance 150 (e.g., "tear down" the instance) to free up resources for other instances 150 associated with other executions. Thus, the on-demand code execution system 110 may facilitate execution of code "on-demand" in a resource-efficient and secure manner.

In accordance with embodiments of the present disclosure, all or a portion of the functionality required by the client device 102 to establish a peer-to-peer connection (e.g., via the ICE framework) is implemented via tasks on the on-demand code execution system 110. The system 110 can be configured to make such tasks callable on the system 110 via a RESTful interface. Thus, by transmitting REST API calls to the system 110, a client device 102 may execute tasks on the system that generate, read and write signaling messages to appropriate message collections on the message system 160. In this manner, a client device 102 is enabled, via the RESTful API, to establish a peer-to-peer connection with the streaming video system 170 and obtain a video stream.

The client devices 102, messaging system 160, on-demand code execution system 110, and streaming video system 170 are shown in FIG. 1 as in communication via a network 104. Network 104 may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110, messaging system 160, and streaming video system 170 are depicted in FIG. 1 as operating in a distributed computing environment including several computer systems that are interconnected using one or more computer networks (not shown in FIG. 1). The on-demand code execution system 110, messaging system 160, and streaming video system 170 could also operate within a computing environment having a fewer or greater number of devices than are illustrated in FIG. 1. Thus, the depiction of the on-demand code execution system 110, messaging system 160, and streaming video system 170 in FIG. 1 should be taken as illustrative and not limiting to the present disclosure. For example, the on-demand code execution system 110, messaging system 160, and streaming video system 170 or various constituents thereof could implement various Web services components, hosted or "cloud" computing environments, and/or peer to peer network configurations to implement at least a portion of the processes described herein. In some instances, the on-demand code execution system 110, messaging system 160, and streaming video system 170 may be combined into a single service.

Further, on-demand code execution system 110, messaging system 160, and streaming video system 170 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

While some functionalities are generally described herein with reference to individual components of the streaming video system 170, other components or a combination of components may additionally or alternatively implement such functionalities. For example, while the streaming video system 170 is depicted in FIG. 1 as including media coordinators 174, functionalities of these coordinators 174 may additionally or alternatively be implemented by media providers 172. Thus, the specific configuration of elements within FIG. 1 is intended to be illustrative.

Figure 2:
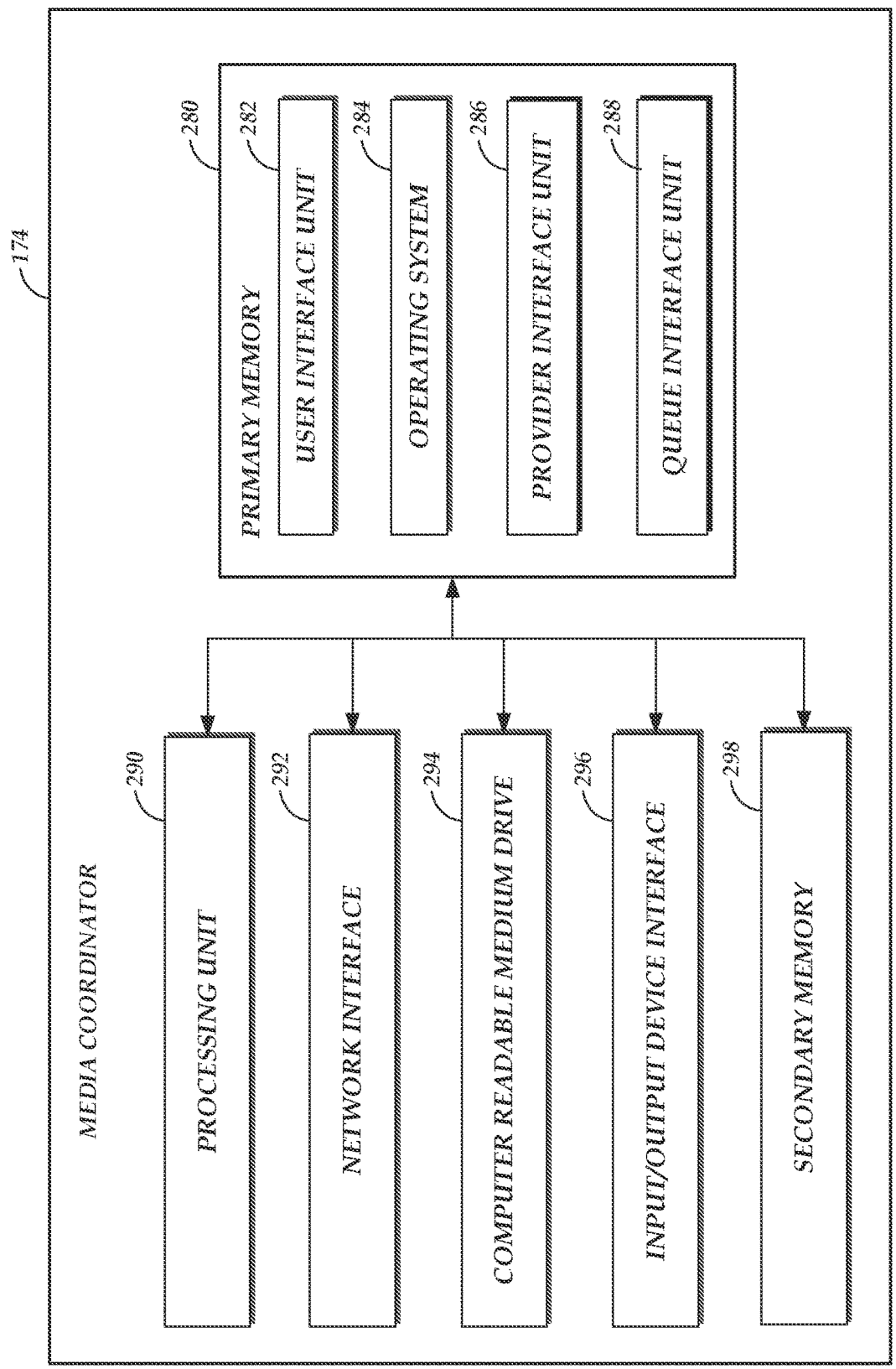
FIG. 2 depicts a general architecture of a computing system implementing a media coordinator of FIG. 1.

FIG. 2 depicts a general architecture of a computing system implementing a media coordinator 174 of FIG. 1. The general architecture of the media coordinator 174 depicted in FIG. 2 includes an arrangement of computer hardware and software that may be used to implement aspects of the present disclosure. The hardware may be implemented on physical electronic devices, as discussed in greater detail below. The media coordinator 174 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the media coordinator 174 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the media coordinator 174, with a higher speed but lower total capacity than secondary memory 298.

The primary memory 280 may store an operating system 284 that provides computer program instructions for use by the processing unit 290 in the general administration and operation of the media coordinator 174. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device.

In addition to and/or in combination with the user interface unit 282, the memory 280 may include a provider interface unit 286 executable to interface with a media provider 172, and a queue interface unit 288 executable to interface with queues of a message system.

The media coordinator 174 of FIG. 2 is one illustrative configuration of such a device, of which others are possible. For example, while shown as a single device, a media coordinator 174 may in some embodiments be implemented as multiple physical host devices. While described in FIG. 2 as a media coordinator 174, similar components may be utilized in some embodiments to implement other devices shown in the environment 100 of FIG. 1.

Figure 3A:
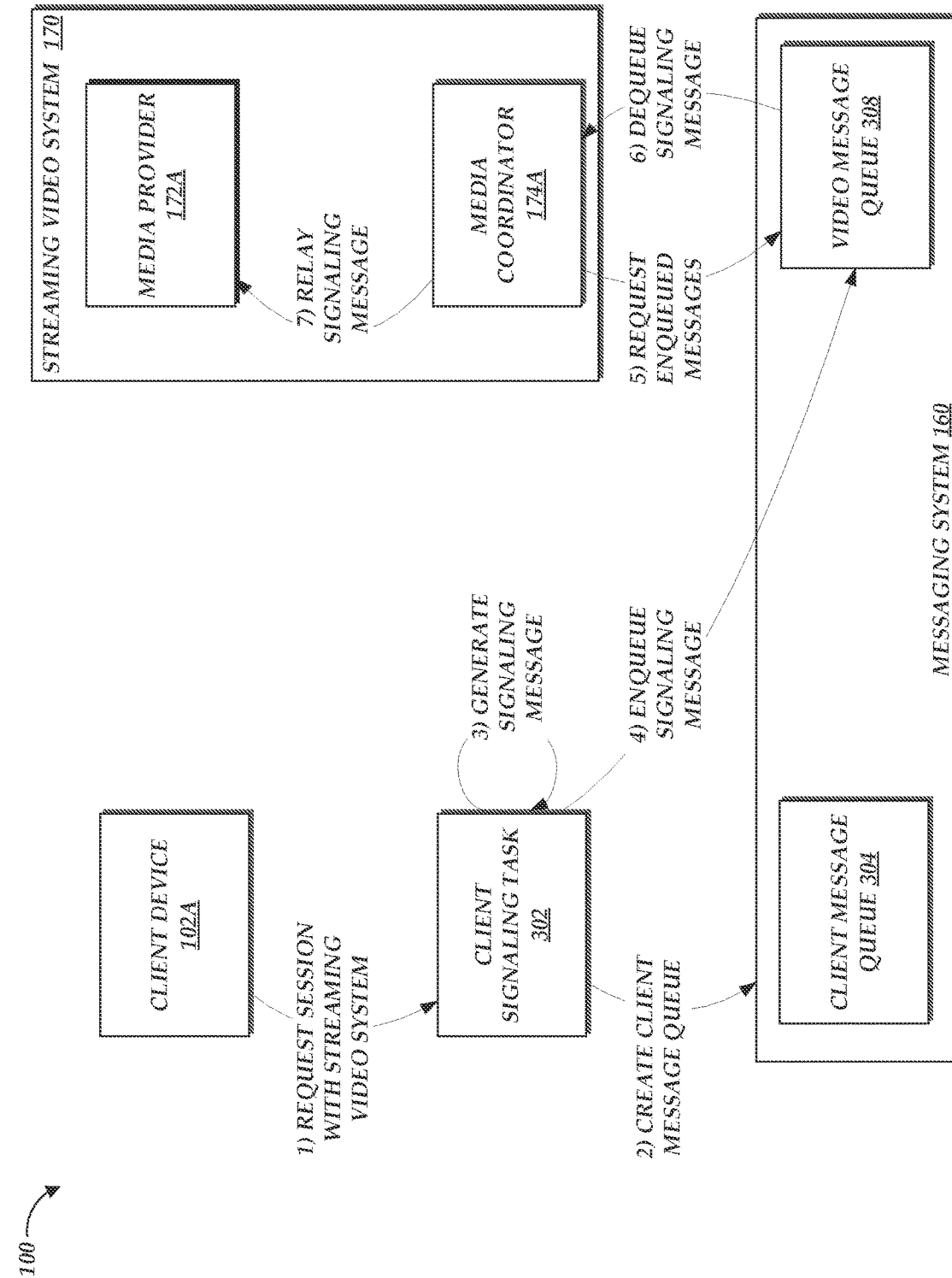
FIGS. 3A and 3B depict illustrative interactions for utilizing message queues on a messaging system of FIG. 1 to conduct signaling between a client device and a media provider to enable establishment of a peer-to-peer connection between these devices.
Figure 3B:
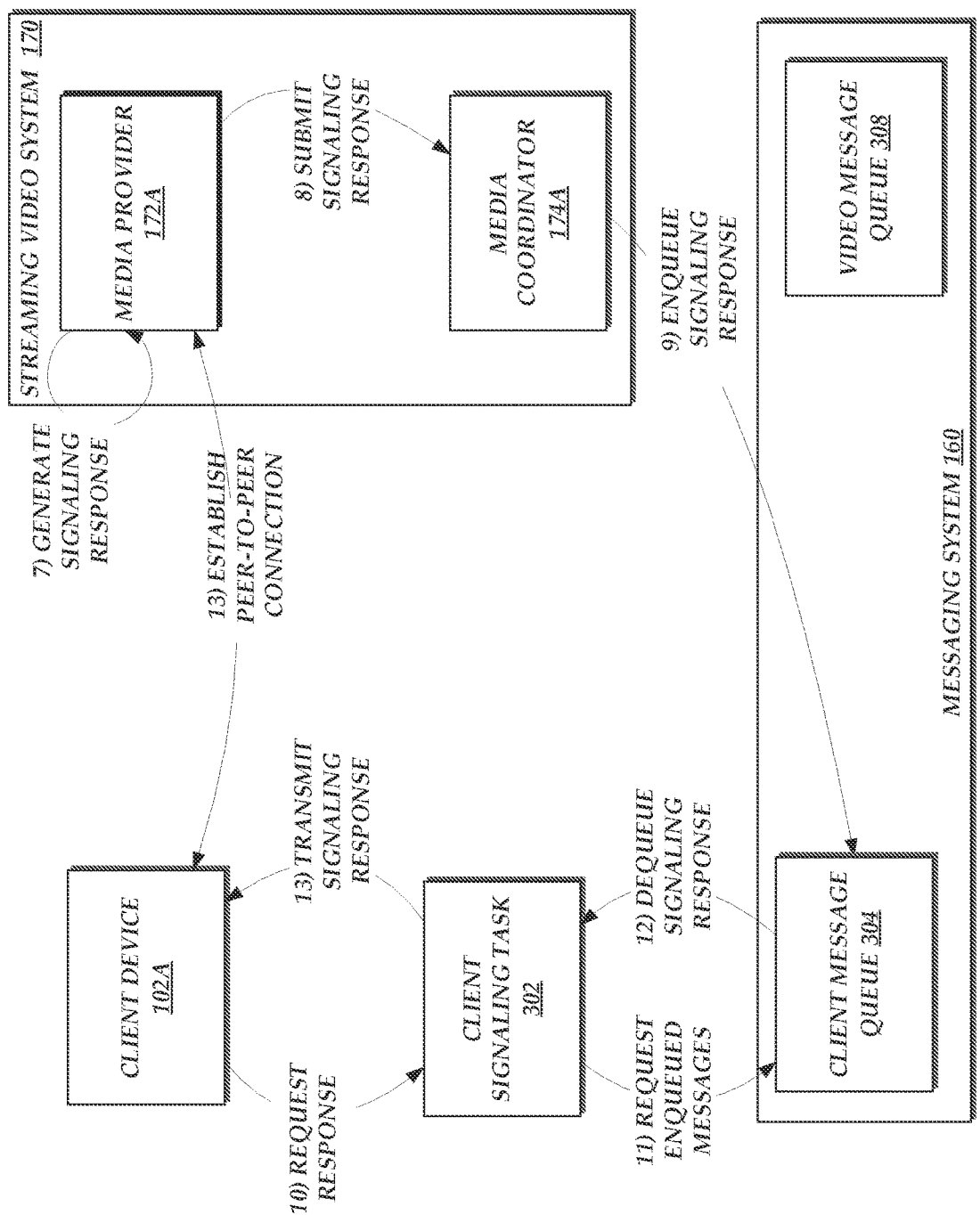

With reference to FIGS. 3A and 3B, illustrative interactions are depicted for utilizing message queues on the messaging system 160 to conduct signaling between a client device 102A and a media provider 172A to enable establishment of a peer-to-peer connection between these devices. Specifically, FIG. 3A depicts transmission of a message from the client device 102A to the media provider 172A via a video message queue 308, while FIG. 3B depicts transmission of a response from the media provider 172A to the client device 102A via a client message queue 308. Each of the client message queue 304 and video message queue 308 are implemented as a logical collection of messages on the messaging system 160. It is assumed for the purposes of description of FIGS. 3A and 3B that a video message queue 308 has previously been established at the messaging system 160. For example, the media provider 172A on initialization of a video stream may register that stream with a media coordinator 174, which coordinator 174 may instruct the messaging system 160 to generate the video message queue 308 for the message. In one embodiment, the video message queue 308 is identified based on an identifier of the video to which it pertains. For example, each video provided by the streaming video system 170 may be associated with a unique identifier. The corresponding video message queue 308 for the video may be identified by that same unique identifier, or a uniform transformation of the unique identifier. In this manner, devices that wish to establish a peer-to-peer connection with a media provider 172A providing the video may identify the video message queue 308, independent of external mappings or other information. Moreover, identification of video message queues 308 based on a unique identifier of a video (e.g., as opposed to unique identifiers of the media provider 172A or media coordinator 174A) can enable redundancy or failover within the system 170. For example, if a media provider 172A or media coordinator 174A providing a video stream were to fail or become overloaded, a different provider 172 or coordinator 174 could be initialized to read from the video message queue 308, enabling the client device 102A to establish a peer-to-peer connection with the different provider 172. Thus, by identifying video message queues 308 based on an identifier of a video, resiliency of the system 170 is increased.

The interactions of FIG. 3A begin at (1), where the client devices 102A transmits a request for a peer-to-peer session with the streaming video system 170. The request is illustrative addressed to a RESTful API of the video system 170, which API is provided by the on-demand code execution system 110 of FIG. 1. As such, in FIG. 3A, transmission of the request results in execution of a client signaling task 302 on the system 110, corresponding to executable code that assists the client device 102A in signaling with the streaming video system 170. While the interactions of FIG. 3A are described with respect to a task 302, in other embodiments, functionality of the task 302 may be implemented at the client device 102A.

At (2), the client signaling task 302 transmits to the messaging system 160 an instruction to generate a message queue on behalf of the client device 102A, which queue is shown in FIG. 3A as the client message queue 304. In one embodiment, interaction (2) occurs only when a message queue for a client device 102A does not already exist on the messaging system 160. As the client message queue 304 may be intended to only contain messages for delivery to the client device 102A, the queue 304 may be associated with security parameters that limit the ability of unauthorized devices to access the queue 304. In one embodiment, the queue 304 is assigned a random identifier, that is returned from the system 160 to the task 302, and back to the client device 102A (which interactions are not shown in FIG. 3A). The client device 102A may be required to specify such random identifier in future communications, in order to access messages of the queue 304. Additional information may also be returned to the client device 102A. For example, where the STUN/TURN servers 176 require authentication, the client signaling task 302 may return authentication information for the STUN/TURN servers 176 in response to a request. In another embodiment, an identifier of the queue 304 includes a permissions identifier of the client device 102A (e.g., a "role" of the client device 102A with respect to the system 160, an account identifier of the client device, etc.). The messaging system 160 may permit only devices 102 associated with the permissions identifier (e.g., via a login process) to access the queue 304.

At (3), the client signaling task 302 further generates a signaling message, based on information provided by the client device 102A within the initial request. Though a single request is shown in FIG. 3A as interaction (1), which results in both creation of a queue at (2) and generation of a signaling message at (3), in some embodiments the client device 102A may transmit multiple requests, such as multiple API calls, to the system 170. For example, a first request may "log on" to the system 170, resulting in generating of a client queue 304 (e.g., as shown in interaction (2)), and a second request may be trigger creation of a signaling message (e.g., as shown in interaction (2)). Each request may be associated with the same task 302, or the functionality of task 302 may be divided among two separate tasks (or executions of the same task).

In one embodiment, the signaling message is formatted according to the Session Description Protocol (SDP). In another embodiment, the signaling message contains information based on the ICE framework, such as ICE candidates (e.g., network addresses at which a peer might be reached). The general format and content of SDP and ICE framework messages are known in the art and thus will not be described in detail herein. Details regarding generation of SDP messages may be found, for example, within the Internet Engineering Task Force's SDP specification, entitled "SDP: Session Description Protocol" and published July of 2006 as RFC 4566, the entirety of which is incorporated by reference herein. Details regarding generation of ICE framework messages may be found, for example, within the Internet Engineering Task Force's ICE specification, entitled "Interactive Connectivity Establishment (ICE): A Protocol for Network Address Translator (NAT) Traversal for Offer/Answer Protocols" and published April of 2010 as RFC 5245, the entirety of which is incorporated by reference herein. Further information regarding use of ICE framework and SDP messages to facilitate WebRTC peer-to-peer connections may be found in the Worldwide Web Consortium (W3C)'s draft specification, entitled "WebRTC 1.0: Real-time Communication Between Browsers" and published Sep. 27, 2018, the entirety of which is incorporated by reference herein.

After generating a signaling message, the client signaling task 302, at (4), enqueues the signaling message into the video message queue 308. The client signaling task 302 may identify the queue 308, for example, based on an identifier of the video requested (e.g., as included in the request from the client device 102A). The messaging system 160 may thus store the signaling message on the queue 308 for later retrieval.

Thereafter, at (5), the media coordinator 174A requests from the queue 308 enqueued signaling messages, if any. In one embodiment, the media coordinator 174A periodically (e.g., every 100 milliseconds, every second, every 10 seconds, every 30 seconds, etc.) requests messages from the queue 308. In another embodiment, the queue 308 is configured to notify a coordinator 174A of new messages on the queue 308, such as via a "publish/subscribe" or ("pub/sub") mechanism, and thus, interaction (5) may not be required.

At (6), the media coordinator 174A dequeues and retrieves a signaling message from the queue 308. In one embodiment, the media provider 172A may require a specific ordering of signaling messages. For example, the provider 172A may be configured to require SDP messages be processed prior to exchanging ICE framework messages. As such, the media coordinator 174A may selectively dequeue messages from the queue 308, such as by dequeuing SDP messages and ensuring a response is sent by the provider 172A prior to dequeuing ICE messages. At (7), the media coordinator 174A relays the signaling message to the media provider 172, thus enabling a signaling message to be transmitted from the client device 102A to the media provider 172A without use of an intermediary signaling server.

With reference to FIG. 3B, illustrative interactions are shown to facilitate a response to a signaling message to be transmitted from a media provider 172A to a client device 102A. For simplicity, reference numerals in FIG. 3B continue those of FIG. 3A, and thus the two figures may be viewed as a single series of interactions. However, the interactions of these figures may also occur independently.

The interactions of FIG. 3B being at (7), where the media provider 172A generates a response to a signaling message (e.g., as received via the interactions of FIG. 3A). The response may be generated in accordance with the WebRTC protocol. For example, an SDP message may be responded to with an SDP response, while message containing ICE candidates of the client device 102A may be responded to with a message specifying ICE candidates of the media provider 172A.

At (8), the media provider 172A submits the signaling response to the media coordinator 174A, which in turn enqueues the response onto the client message queue 304 associated with the client. The media coordinator 174A may identify the client message queue 304, for example, based on identification information included within the signaling message to which the enqueued message is a response.

Thereafter, at (10), the client device 102A requests a response from the steaming video system 170 via the system 170's API, which results in execution of the client signaling task 302. In one embodiment, the client device 102A periodically requests a response after sending a request for a video (e.g., every 100 milliseconds, every second, every 10 seconds, every 30 seconds, etc.). The client signaling task 302, in turn, requests enqueued messages from the client message queue 304. In another embodiment, the queue 304 is configured to notify the task 302 of new messages on the queue 304, such as via a "publish/subscribe" or ("pub/sub") mechanism, and thus, interactions (10) and (11) may not be required.

At (12), the client signaling task 302 dequeues the signaling response from the client message queue 304, and transmits the response to the client device 102A. Thus, the client devices 102A obtains the signaling response from the system 170 without use of a signaling server. While interactions to exchange a single signaling message/response are shown in FIGS. 3A and 3B, these interactions may be repeated to enable client device 102A and media provider 172A to exchange any number of messages. For example, the interactions may be repeated twice, with a first message and response representing SDP messages, and a second message and response representing ICE candidate messages. After exchanging signaling messages, the client device 102A and media provider 172A are assumed for the purposes of description of these figures to have obtained all necessary information to establish a peer-to-peer connection. This information may include, for example, public network addresses and port numbers of the respective devices, capabilities of the devices to send/receive various formats, and the like. Thus, at (13), the client device 102A and the streaming video system 170 utilize information from the exchanged signaling messages to establish a peer-to-peer connection.

One skilled in the art will appreciate that in some embodiments the interactions of FIGS. 3A and 3B may include additional interactions not shown therein. For example, prior to transmission of a signaling message or response, the client device 102, media provider 172A, or both may interact with a STUN server (e.g., of the STUN/TURN servers 176 in FIG. 1) to obtain public network addresses associated with those respective devices. As a further example, initiation of a peer-to-peer connection may include multiple attempted initiations, to various candidate addresses identified, e.g., within ICE messages and responses exchanged between the devices. In instances where initiation of a peer-to-peer connection fails, the client device 102A and media provider 172A may alternatively connect via a TURN server (e.g., of the STUN/TURN servers 176 in FIG. 1).

Figure 4A:
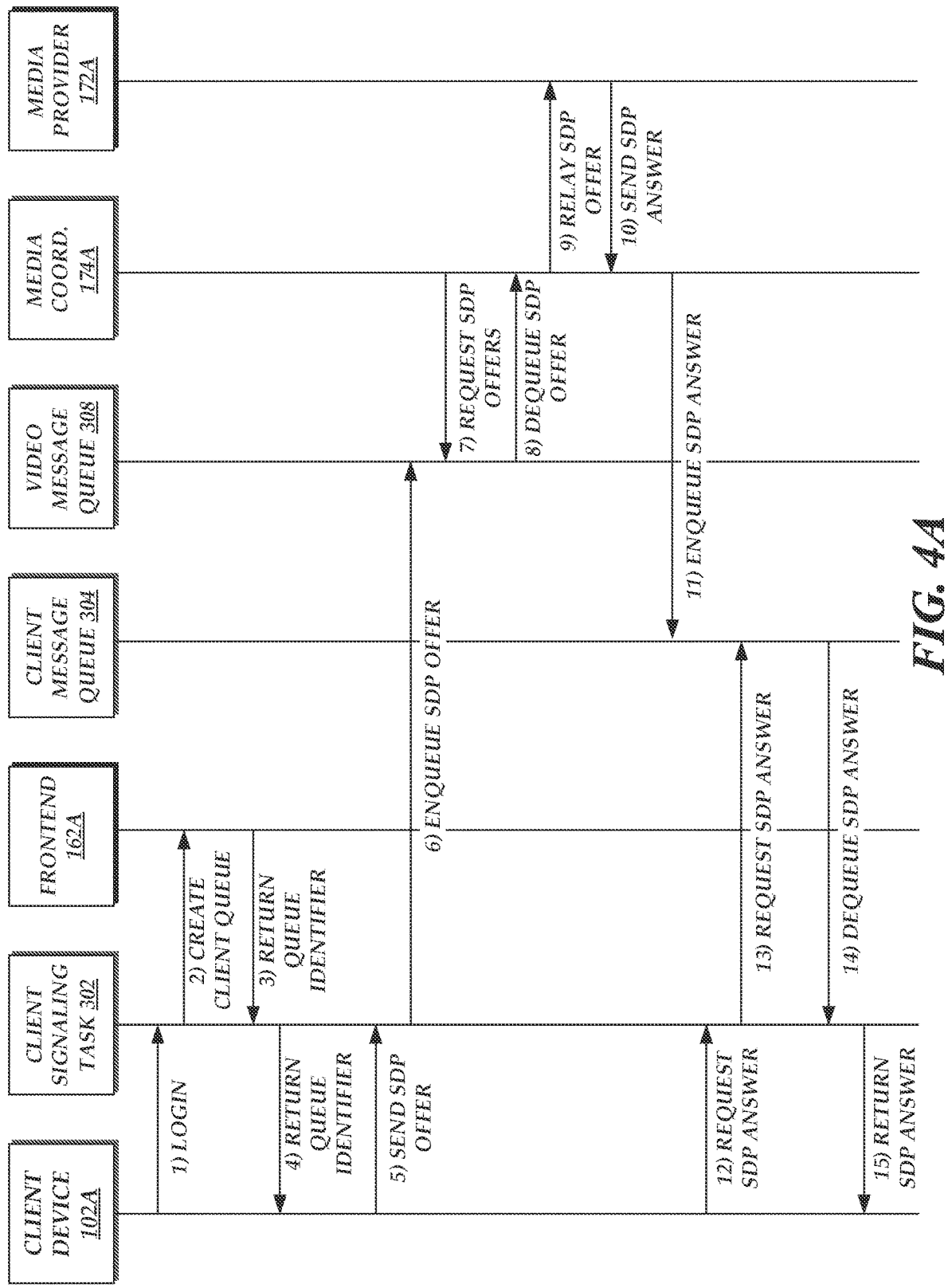
FIGS. 4A and 4B depict illustrative interactions for exchanging SDP and ICE candidate messages using queues on a messaging system, negating the need for a signaling server to facilitate that exchange.
Figure 4B:
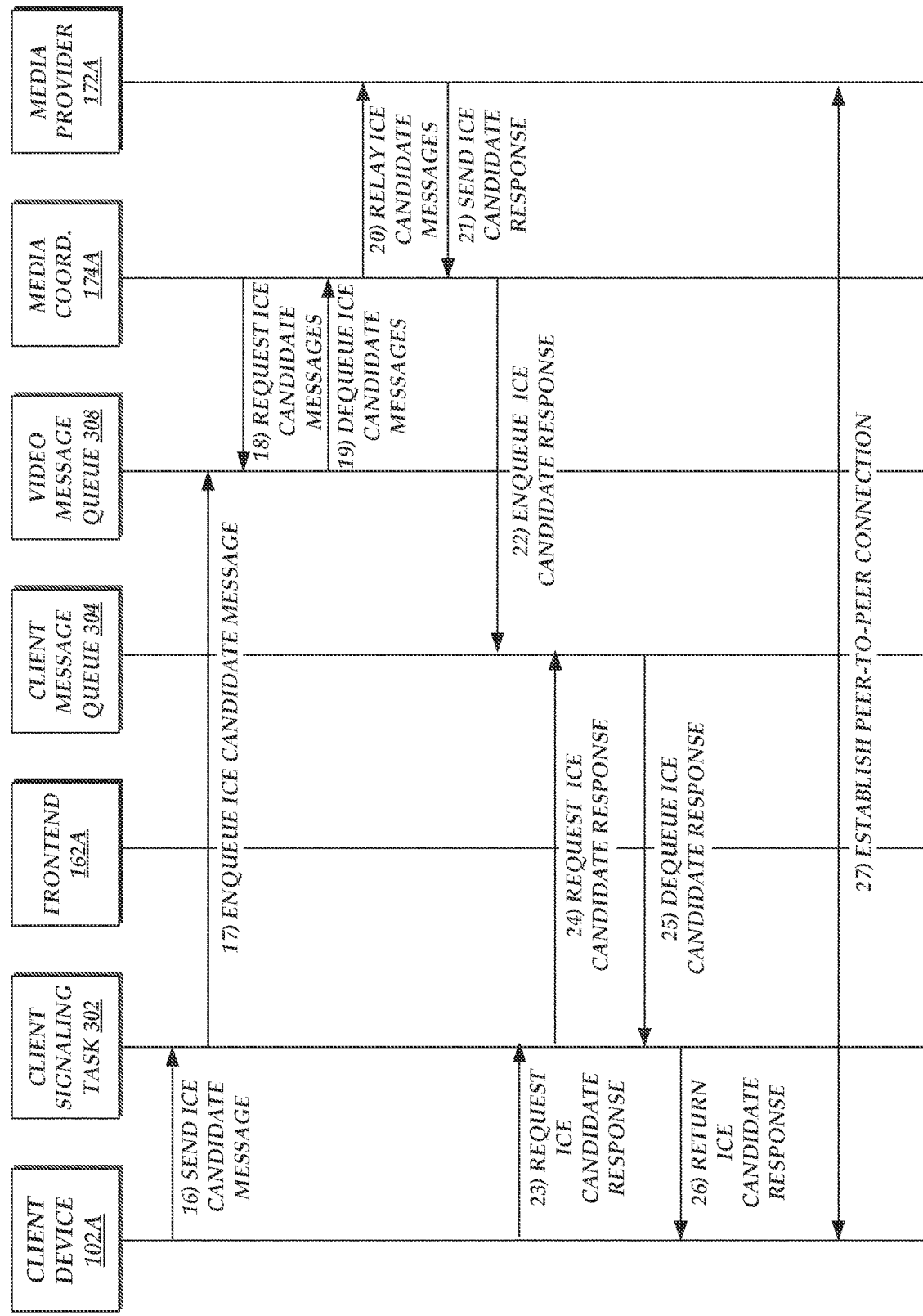

The interactions of FIGS. 3A-3B may be further understood with reference to FIGS. 4A-4B, depicting one embodiment of those interactions. Specifically, FIGS. 4A and 4B depict illustrative interactions for exchanging SDP and ICE candidate messages using queues on a messaging system 160, negating the need for a signaling server to facilitate that exchange. The exchange of SDP messages is depicted in FIG. 4A, while the exchange of ICE candidate messages is depicted in FIG. 4B.

The interactions of FIG. 4A begin at (1), where the client device 102A logs in to the streaming video system 170, such as by calling an API of the system. As shown in FIG. 4A, the call is routed to an execution of client signaling task 302, executed on the on-demand code execution system 110. The task 302 illustratively authenticates the client device 102A, and transmits instructions to a frontend 162A of the messaging system to create queue on behalf the client device 102A, which queue is shown in FIG. 4A as client message queue 304. At (3), the frontend 162A returns an identifier of the queue 304 to the task 302, which in turn returns the identifier to the client 102. Illustratively, the identifier may be passed by the client 102 in later messages to facilitate exchange with the streaming video system 170. In one embodiment, the queue identifier contains authentication information, such as a cryptographically selected random identifier or an account or role identifier of the client device 102A. Thus, subsequent devices 102 attempting to enqueue or dequeue messages from the queue 304 can be authenticated as having access to perform such operations by virtue of the identifier of the queue 304. For example, where the queue identifier includes a cryptographically selected random identifier, specification of the identifier may authenticate a calling client device 102. Where the queue identifier includes an account or role identifier, the queue 304 may verify that a calling device 102 possesses authentication information matching that account or role identifier prior to allowing a call. Thus, inclusion of authentication information within a queue identifier may enable authentication of calling devices 102 without, for example, reliance on external mappings or authentication information.

At (5), the client device 102A sends an SDP offer to the streaming video system 170, such as by calling an API of the system. The SDP offer may include, for example, the video capabilities of the client device 102A or authentication information to be used to authenticate transmissions between the client device 102 and another peer. The call is again routed to an execution of client signaling task 302 executed on the on-demand code execution system 110, which task then enqueues the SDP offer into the video message queue 308, at (6). The video message queue 308 is illustratively identified based on the video requested by the client device 102A (e.g., as indicated by a uniform resource identifier to which the SDP offer was transmitted), again reducing or eliminating requirements for externally maintained mappings or information.

At (7), the media coordinator 174A requests from the video message queue 308 enqueued SDP messages. As noted above, the coordinator 174A may illustratively be configured to periodically request enqueued messages from the queue 308. The coordinator 174A then, at (8), dequeues the SDP offer, and relays to offer to the media provider 172A at (9). The media provider 172A processes the offer in accordance with the WebRTC protocol, and returns an SDP answer to the coordinator 174A at (10). The coordinator 174A then, at (11), enqueues the SDP answer into the client message queue 304. The coordinator 174A may identify the client message queue 304, for example, based on inclusion of an identifier for the queue 304 within the SDP offer.

At (12), the client device 102A requests the SDP answer, such as by calling an API of the system 170. As noted above, the client device 102A may illustratively be configured to periodically request an SDP answer after sending an SDP offer. The task 302 called as a result of the API call thus requests from the client message queue 304 enqueued SDP messages. At (14), the task 302 dequeues the SDP answer, and returns to answer to the client device 102A, thus completing an exchange of SDP information between the client device 102A and the media provider 172A.

The interactions of FIG. 4A are continued in FIG. 4B, which generally depicts interactions for exchanging ICE candidate messages between the client device 102A and the media provider 172A, in order to establish a peer-to-peer connection. Specifically, at (16), the client device 102A sends an ICE candidate message to the streaming video system 170, such as by calling an API of the system. The ICE candidate message may include, for example, the network addresses associated with the client device 102A. The call is again routed to an execution of client signaling task 302 executed on the on-demand code execution system 110, which task then enqueues the ICE candidate message into the video message queue 308, at (17).

At (18), the media coordinator 174A requests from the video message queue 308 enqueued ICE candidate message. As noted above, the coordinator 174A may illustratively be configured to periodically request enqueued messages from the queue 308. The coordinator 174A then, at (19), dequeues the ICE candidate message, and relays to ICE candidate message to the media provider 172A at (20). The media provider 172A processes the ICE candidate message in accordance with the WebRTC protocol, and returns a responsive ICE candidate message to the coordinator 174A at (21). The coordinator 174A then, at (22), enqueues the ICE candidate message into the client message queue 304. The coordinator 174A may identify the client message queue 304, for example, based on inclusion of an identifier for the queue 304 within the ICE candidate message sent by the client device 102A.

At (23), the client device 102A requests the ICE candidate message, such as by calling an API of the system 170. As noted above, the client device 102A may illustratively be configured to periodically request an ICE candidate message from the provider 172A after sending its own ICE candidate message. The task 302 called as a result of the API call thus requests from the client message queue 304 enqueued ICE candidate messages at (24). At (25), the task 302 dequeues the ICE candidate message, and returns to answer to the client device 102A, thus completing an exchange of ICE candidate information between the client device 102A and the media provider 172A.

At (27), based on the previously exchanged SDP offer/answer and ICE candidate messages, the client device 102A and the media provider 172A establish a peer-to-peer connection, thus enabling communication between the two devices.

Figure 5:
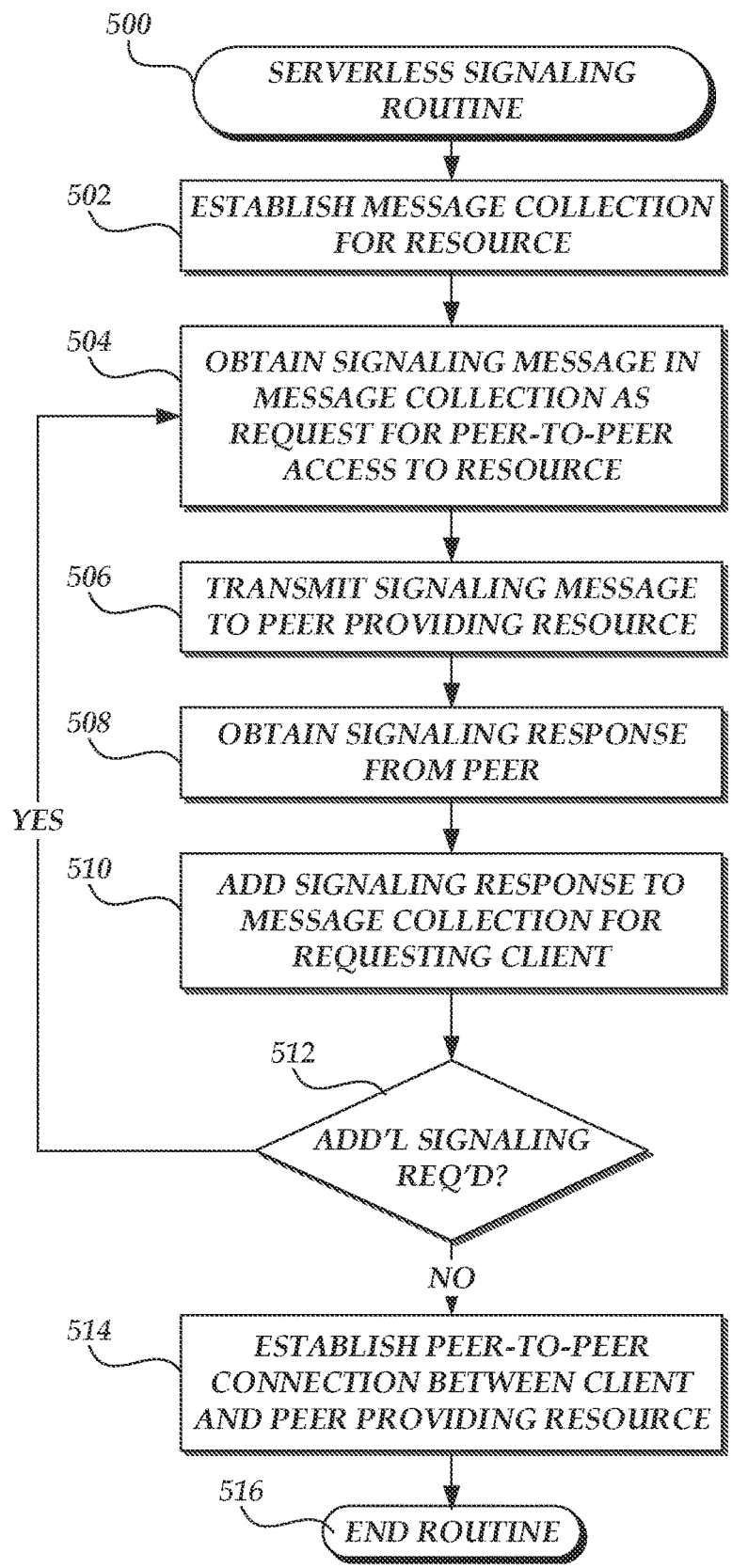
FIG. 5 depicts an illustrative routine for utilizing message collections to exchange signaling information prior to establishing a peer-to-peer connection.

With reference to FIG. 5, an illustrative routine 500 for utilizing message collections (e.g., message queues) to exchange signaling information prior to establishing a peer-to-peer connection will be described. The routine 500 may be implemented, for example, by the streaming video system 170 of FIG. 1 (e.g., using resource of or in cooperation with other elements of FIG. 1, such as the messaging system 160 and on-demand code execution system 110). The routine 500 will thus be described with reference to the streaming video system 170, and particularly with regard to videos that the system 170 may transmit to client devices 102 via peer-to-peer connections. However, the routine 500 may generally be implemented by any devices that desire to provide access to resources via a peer-to-per network connection.

The routine 500 begins at block 502, where the streaming video system 170 establishes, on a messaging system, a logical message collection associated with a resource, such as a particular video to be made available to client devices 102. Note that while the term "collection" is used herein to refer to a logical grouping of messages, the "collection" may initially be empty of messages; thus, use of the term should not imply that messages actually exist within the collection at a given time. Examples of message collections include message queues and message streams, as discussed above. The message collection may illustratively be identified based on the resource to be provided.

At block 504, the system 170 obtains a signaling message within the message collection. The signaling message illustratively is placed into the collection by a client device 102 as a request to be provided with the resource to which the collection corresponds, via peer-to-peer connection. Note that in contrast to a typical client-server model, messages within the routine 500 are directed to a collection associated with a resource, rather than to a particular server providing such resource. Thus, in the routine 500, a client device 102 need not, for example, know the network address of a particular device providing the resource. The signaling message may illustratively include information relevant to establishing a peer-to-peer connection with the client device 102, which information can include (but is not limited to) ICE candidate messages, SDP offers, and a designation of a message collection on a messaging system to which signaling responses may be transmitted.

At block 506, the system 170 transmits the signaling message to a peer (e.g., a media provider 172) providing access to the resource. Illustratively, the system 170 may be configured to assign a particular peer to each resource, and each such peer may be configured to periodically check the message collection for the resource to detect signaling messages within that collection. In some instances, an intermediary device (e.g., a media coordinator 174) may assist a peer in obtaining signaling messages within a collection.

At block 508, the system 170 obtains a signaling response from the peer providing access to the resource. For example, according to the WebRTC protocol, a SDP offer message may be responded to with an SDP answer, an ICE candidate message may be responded to with the peer's own ICE candidate list, etc.

At block 510, the signaling response is added to a message collection for the requesting client device 102, as identified for example in the initial signaling message. While not shown in FIG. 5, in some embodiments the system 170 may be configured to establish the client's message collection on a messaging system, such as in connection with an initial request or log in by the client device 102, as described above with reference to FIGS. 3A-4B. The client device 102 is illustratively configured to obtain the signaling response from the client's message collection, thus facilitating an exchange of signaling messages between the client device 102 and the peer providing access to a resource.

At block 512, implementation of the routine 500 varies according to whether additional signaling is required to establish a peer-to-peer connection between client device 102 and the peer providing access to a resource. If additional signaling is required, the routine 500 returns to block 504, where blocks 504 through 510 may be repeated to continue the exchange of signaling messages. Where additional signaling is not required, the routine 514 proceeds to block 516 where a peer-to-peer connection is established between the client device 102 and the peer providing access to a resource.

Implementation of blocks 512 and 514 may vary across embodiments of the present disclosure. In one embodiment, block 512 is implicitly determined based on whether a peer-to-peer connection has been established. For example, at block 512, a peer within the system may determine whether communications are successfully being exchanged between the peer and the client device 102, and if so, blocks 512 and 514 are satisfied. Otherwise, the peer may continue to await additional signaling messages within the message collection of a resource. Thus, while shown in two blocks for ease of description, blocks 512 and 514 may in some embodiments be implemented as a single logical block.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to facilitate establishment of a peer-to-peer connection between peers to provide a network resource, without requiring an intermediary signaling server to conduct signaling between the peers, the system comprising:

a messaging system comprising one or more processors and configured to provide:

a resource message collection associated with the network resource and configured to contain signaling messages from a first peer and to make the signaling messages from the first peer available for retrieval by a second peer providing access to the network resource; and a peer message collection associated with the first peer and configured to contain signaling responses from the second peer and to make the signaling responses from the second peer available for retrieval by the first peer, wherein the first peer, the second peer, and the messaging system each represent distinct computing devices in communication over a network; and wherein the messaging system is configured to:

obtain, from the second peer, a request to retrieve, from the resource message collection of the messaging system, a signaling message currently stored in the resource message collection at a time of the request to retrieve the signaling message and previously added to the resource message collection by the first peer, wherein the signaling message represents a request to access the network resource, and wherein the signaling message includes network availability information of the first peer used by the second peer in establishment of the peer-to-peer connection, and wherein the signaling message identifies the peer message collection associated with the first peer;

transmit the signaling message to the second peer;

store, within the peer message collection of the messaging system, a signaling response provided by the second peer, wherein the signaling response includes network availability information of the second peer used by the first peer in the establishment of the peer-to-peer connection;

obtain, from the first peer, a request to retrieve the signaling response as currently stored in the peer message collection at a time of the request to retrieve the signaling response and previously provided to the messaging system by the second peer; and transmit the signaling response to the first peer, wherein the first peer is configured to utilize the signaling response to establish the peer-to-peer connection between the first peer and the second peer.

2. The system of claim 1, wherein the resource message collection is at least one of a message queue or a message stream.

3. The system of claim 1, wherein the signaling message corresponds to at least one of a message formatted according to the Session Description Protocol (SDP) or a message formatted according to the Interactive Connectivity Establishment (ICE) framework.

4. The system of claim 1 further comprising the second peer.

5. The system of claim 4, wherein the signaling message and signaling response are formatted in accordance with the Web Real-Time Communication (WebRTC) protocol, and wherein the second peer is configured to transmit the network resource from the second peer to the first peer over the peer-to-peer connection according to the WebRTC protocol.

6. The system of claim 4, wherein the second peer is configured to repeatedly retrieve signaling messages from the resource message collection and store signaling responses into the peer message collection until the peer-to-peer connection is established.

7. A method implemented at a messaging system facilitating establishment of a peer-to-peer connection between a first peer providing a network resource and a second peer receiving the network resource, wherein the messaging system, the first peer, and the second peer each represent distinct computing devices in communication over a network, the method comprising:

obtaining, from the first peer, a query requesting signaling messages associated with the resource and currently stored within a resource message collection provided by the messaging system at a time when the query requesting signaling messages is obtained, the signaling messages representing requests to access the resource that are currently stored within the resource message collection and previously added to the resource message collection by peers distinct from the first peer and from the messaging system;

transmitting, from the resource message collection and to the first peer, a signaling message from a second peer stored in the resource message collection by the second peer, wherein the signaling message includes network availability information of the second peer used by the first peer in the establishment of the peer-to-peer connection, and wherein the signaling message identifies a peer message collection, on the messaging system, that is associated with the second peer;

storing, within the peer message collection, a signaling response provided by the first peer and responsive to the signaling message, wherein the signaling response includes network availability information of the first peer used by the second peer in the establishment of the peer-to-peer connection;

obtaining, from the second peer, a request to retrieve the signaling response as currently stored in the peer message collection and previously provided to the messaging system by the first peer; and transmitting the signaling response to the second peer, wherein the second peer is configured to utilize the signaling response to establish the peer-to-peer connection between the first peer and the second peer.

8. The method of claim 7 further comprising:
authenticating the second peer at the messaging system;
generating the peer message collection at the messaging system; and
providing to the second peer identifying information for the peer message collection for inclusion in the signaling message.

9. The method of claim 7, wherein generating the peer message collection at the messaging system is responsive to a request by the second peer to initiate the peer-to-peer connection.

10. The method of claim 7, wherein the first peer is included within a content delivery system providing a plurality of network resources, and wherein the method further comprising generating, on the messaging system, a distinct resource message collection associated with each of the plurality of network resources.

11. The method of claim 10 further comprising:
detecting a failure of the first peer; and
associating an alternative peer within the content delivery system with the network resource, wherein associating the alternative peer with the network resource causes signaling messages within the resource message collection to be passed to the alternative peer.

12. The method of claim 10, wherein the signaling message is stored in the resource message collection by the second peer by interaction between the second peer and a serverless task representing code executable to generate the signaling message on behalf of the second peer.

13. The method of claim 12, wherein the serverless task provides a application programming interface (API) to the second peer that acts in accordance with a representational state transfer (REST) architectural style.

14. One or more non-transitory computer-readable media comprising computer-executable instructions that, when executed by messaging system facilitating establishment of a peer-to-peer connection between a first peer providing a network resource and a second peer receiving the network resource, causes the messaging system to obtain, from the first peer, a query requesting signaling messages currently stored at a time of the query requesting signaling messages, within a resource message collection provided by the messaging system and associated with the resource, the signaling messages representing requests to access the resource that are currently stored within the resource message collection and previously added to the resource message collection by peers distinct from the first peer and from the messaging system;

transmit, from the resource message collection and to the first peer, a signaling message from a second peer, wherein the signaling message includes network availability information of the second peer used by the first peer in the establishment of the peer-to-peer connection, and wherein the signaling message identifies a peer message collection, on the messaging system, that is associated with the second peer;

store, within the peer message collection, a signaling response provided by the first peer and responsive to the signaling message, wherein the signaling response includes network availability information of the first peer used by the second peer in the establishment of the peer-to-peer connection;

obtain, from the second peer, a request to retrieve the signaling response as currently stored the peer message collection and previously provided to the messaging system by the first peer; and transmit the signaling response to the second peer, wherein the second peer is configured to utilize the signaling response to establish the peer-to-peer connection between the first peer and the second peer.

15. The one or more non-transitory computer-readable media of claim 14, further comprising instructions executable on a coordinator device to:

obtain the signaling message from the resource message collection;

relay the signaling message from the coordinator device to the first peer;

obtain, at the coordinator device, the signaling response; and add to the peer message collection the signaling response.

16. The one or more non-transitory computer-readable media of claim 14, wherein the computer-executable instructions further cause the messaging system to generate the peer message collection.

17. The one or more non-transitory computer-readable media of claim 16, wherein generating the peer messaging collection is responsive to authenticating the second peer at the messaging system.

18. The one or more non-transitory computer-readable media of claim 16, wherein generating the peer messaging collection is responsive to a request by the second peer to initiate the peer-to-peer connection.

19. The one or more non-transitory computer-readable media of claim 16, wherein the computer-executable instructions further cause the messaging system to generate the peer collection with an identifier that includes permissions information associating the peer collection with the second peer.

20. The one or more non-transitory computer-readable media of claim 14, wherein the first peer is included within a content delivery system providing a plurality of network resources, and wherein the computer-executable instructions further cause the messaging system to generate, on the messaging system, a distinct resource message collection associated with each of the plurality of network resources.

* * * * *